(12) United States Patent
Arai et al.

(10) Patent No.: US 8,246,732 B2
(45) Date of Patent: Aug. 21, 2012

(54) EXHAUST GAS CLEANING APPARATUS

(75) Inventors: Hiroyuki Arai, Tokyo (JP); Kotaro Kawamura, Tokyo (JP); Makoto Kashiwagi, Tokyo (JP)

(73) Assignee: Ebara Corporation, Tokyo (JP)

( * ) Notice: Subject to any disclaimer, the term of this patent is extended or adjusted under 35 U.S.C. 154(b) by 82 days.

(21) Appl. No.: 12/452,525

(22) PCT Filed: Jul. 8, 2008

(86) PCT No.: PCT/JP2008/062655
§ 371 (c)(1),
(2), (4) Date: Jan. 7, 2010

(87) PCT Pub. No.: WO2009/011323
PCT Pub. Date: Jan. 22, 2009

(65) Prior Publication Data
US 2010/0116140 A1 May 13, 2010

(30) Foreign Application Priority Data
Jul. 13, 2007 (JP) .................................. 2007-185012

(51) Int. Cl.
*B01D 47/06* (2006.01)
(52) U.S. Cl. ................ 96/257; 96/270; 96/273; 96/322; 95/224
(58) Field of Classification Search ............. 96/244, 96/252, 256, 257, 270, 271, 273, 272, 253, 96/255, 263, 267, 296, 297, 322, 299, 303, 96/305, 310, 311, 315, 316, 329, 326, 362, 96/367
See application file for complete search history.

(56) References Cited

U.S. PATENT DOCUMENTS

| | | | | | |
|---|---|---|---|---|---|
| 3,140,163 | A | * | 7/1964 | Hausberg | 96/360 |
| 3,852,409 | A | * | 12/1974 | Martin et al. | 423/243.08 |
| 3,969,482 | A | * | 7/1976 | Teller | 423/235 |
| 4,102,982 | A | * | 7/1978 | Weir, Jr. | 423/243.1 |
| 4,140,501 | A | * | 2/1979 | Ekman | 96/232 |
| 4,157,250 | A | * | 6/1979 | Regehr et al. | 96/299 |
| 4,193,774 | A | * | 3/1980 | Pilat | 95/71 |

(Continued)

FOREIGN PATENT DOCUMENTS

JP  55-13178  1/1980

(Continued)

OTHER PUBLICATIONS

International Search Report issued Aug. 19, 2008 in International (PCT) Application No. PCT/JP2008/062655.

(Continued)

*Primary Examiner* — Duane Smith
*Assistant Examiner* — Pankti Patel
(74) *Attorney, Agent, or Firm* — Wenderoth, Lind & Ponack, L.L.P.

(57) ABSTRACT

An exhaust gas cleaning apparatus according to the present invention includes a wall member configured to form a gas passage for allowing an exhaust gas to pass therethrough, and a mist nozzle and a water film nozzle disposed in the gas passage. The mist nozzle forms mist in the gas passage, and the water film nozzle forms water film in the gas passage. The mist nozzle is disposed further toward the upstream side in a flowing direction of the exhaust gas than the water film nozzle. Plural sets of the mist nozzle and the water film nozzle may be provided.

11 Claims, 10 Drawing Sheets

U.S. PATENT DOCUMENTS

| | | | |
|---|---|---|---|
| 4,374,813 A * | 2/1983 | Chen et al. | 423/243.08 |
| 4,469,493 A | 9/1984 | Tuovinen et al. | |
| 4,853,014 A * | 8/1989 | Bloch | 96/228 |
| 4,986,838 A * | 1/1991 | Johnsgard | 96/265 |
| 5,123,836 A | 6/1992 | Yoneda et al. | |
| 5,391,220 A * | 2/1995 | Patterson | 95/69 |
| 5,531,801 A * | 7/1996 | Sewell et al. | 96/240 |
| 5,660,615 A * | 8/1997 | Neumann et al. | 95/187 |
| 5,693,293 A | 12/1997 | Reichardt et al. | |
| 6,550,751 B1 * | 4/2003 | Brown et al. | 261/113 |
| 6,638,343 B1 * | 10/2003 | Kawamura et al. | 95/218 |
| 6,946,022 B2 | 9/2005 | Okuda et al. | |
| 7,318,857 B2 * | 1/2008 | Ray et al. | 96/44 |
| 7,326,286 B2 * | 2/2008 | Okada et al. | 96/271 |
| 2004/0134351 A1 * | 7/2004 | Rosen | 95/218 |
| 2005/0022667 A1 * | 2/2005 | Schwab | 95/216 |
| 2005/0081720 A1 * | 4/2005 | Echizen et al. | 96/290 |
| 2005/0126393 A1 * | 6/2005 | Chen et al. | 95/224 |
| 2006/0249028 A1 * | 11/2006 | Riccardi | 96/322 |

FOREIGN PATENT DOCUMENTS

| | | |
|---|---|---|
| JP | 2000-107540 | 4/2000 |
| JP | 2003-190735 | 7/2003 |
| JP | 2004-261777 | 9/2004 |
| JP | 4072815 | 2/2008 |
| RU | 969 298 | 10/1982 |

OTHER PUBLICATIONS

European Search Report issued Feb. 23, 2012 in European Application No. 08778126.6-2113.

* cited by examiner

| | dust removal efficiency (%) |
|---|---|
| experimental example 1 | 87.3 |
| experimental example 2 | 83.4 |
| comparative example | 73.0 |
| fan scrubber | 87.4 |

EXHAUST GAS CLEANING APPARATUS

TECHNICAL FIELD

The present invention relates to an exhaust gas cleaning apparatus for removing fine dust contained in an exhaust gas, and more particularly to an exhaust gas cleaning apparatus which is preferably used in a treatment system for treating an exhaust gas discharged from a manufacturing apparatus of semiconductor devices or liquid crystal panels.

BACKGROUND ART

An exhaust gas containing silane ($SiH_4$) or the like is discharged from manufacturing apparatuses of semiconductor devices or liquid crystal panels. Since silane is a harmful and combustible gas, the exhaust gas from these manufacturing apparatuses cannot be released to the atmosphere as it is. Therefore, it has been customary to introduce the exhaust gas into a treatment system where silane contained in the exhaust gas is oxidized and decomposed to be made harmless.

As this type of treatment system, as disclosed in Japanese laid-open patent publication No. 2003-251130, there has been known a system which has a combustion treatment unit for treating an exhaust gas by combustion and a gas cleaning unit for removing a by-product produced in this combustion treatment unit from the exhaust gas. The exhaust gas is first introduced into the combustion treatment unit where silane in the exhaust gas is oxidatively decomposed by flames generated in the combustion treatment unit. By oxidatively decomposing silane, $SiO_2$ (Silica) is produced as a by-product. Then, the exhaust gas is introduced into the gas cleaning unit where the by-product in the exhaust gas is removed. In the system disclosed in the above patent document, a fan scrubber is used as the gas cleaning unit. This fan scrubber causes gas-liquid contact by rotating an impeller while supplying water in a casing, thereby removing the by-product from the exhaust gas.

The Japanese laid-open patent publication No. 2001-293335 discloses a treatment system for treating fluorine compounds ($NF_3$, $ClF_3$, $SF_6$, $CHF_3$, $C_2F_6$, $Cf_4$) contained in an exhaust gas discharged from a semiconductor device fabrication system (especially, dry etching apparatuses) by using a catalyst layer. In this treatment system, a spray-type gas cleaning apparatus (water spray tower) is disposed upstream of the catalyst layer and this water spray tower cleans the exhaust gas and removes fine dust such as silica or the like contained in the exhaust gas.

The dust existing in the above-mentioned exhaust gas is extremely minute and some of the dust has a diameter of less than 1 μm. The fan scrubber is known as a gas cleaning apparatus capable of removing fine dust at high efficiency. However, the fan scrubber has a more complicated structure than a spray-type gas cleaning apparatus and is expensive. Further, the fan scrubber needs electric power because a motor is used as a drive source of an impeller and has higher running cost. On the other hand, in the spray-type gas cleaning apparatus, it is difficult to remove submicron-order fine dust and dust removal efficiency is low.

SUMMARY OF THE INVENTION

The present invention has been made in view of the above-mentioned conventional drawbacks. It is therefore an object of the present invention to provide a spray-type exhaust gas cleaning apparatus which can remove fine dust contained in an exhaust gas at high efficiency.

In order to achieve the above object, according to an aspect of the present invention, there is provided an exhaust gas cleaning apparatus comprising: a wall member configured to form a gas passage for allowing an exhaust gas to pass therethrough; and at least one set of a mist nozzle and a water film nozzle disposed in the gas passage. The mist nozzle forms mist in the gas passage, and the water film nozzle forms water film in the gas passage. The mist nozzle is disposed further toward the upstream side in a flowing direction of the exhaust gas than the water film nozzle.

In a preferred aspect of the present invention, plural sets of the mist nozzle and the water film nozzle are provided (a set including a mist nozzle and a water film nozzle); and the plural sets of the mist nozzle and the water film nozzle are disposed along the gas passage.

In a preferred aspect of the present invention, a flow control member for regulating flow of the exhaust gas is disposed at an upstream side of the at least one set of the mist nozzle and the water film nozzle.

According to another aspect of the present invention, there is provided an exhaust gas treatment system comprising: the above exhaust gas cleaning apparatus; and an exhaust gas treatment apparatus connected to the exhaust gas cleaning apparatus.

In a preferred aspect of the present invention, the exhaust gas treatment apparatus comprises any of a combustion-type exhaust gas treatment apparatus, a catalytic exhaust gas treatment apparatus and a heater-type exhaust gas treatment apparatus.

According to the present invention, the fine dust contained in the exhaust gas easily adheres to mist by diffusion action (Brownian movement), and thus the dust is removed by contact (inertial impaction) with a water film from the exhaust gas. Specifically, the fine dust is trapped by the mist and becomes large apparently. Therefore, the fine dust easily tends to be brought into contact with the water film formed by a water film nozzle. As a result, the fine dust can be removed from the exhaust gas at high efficiency.

BRIEF DESCRIPTION OF DRAWINGS

FIG. 8 is a table showing results of an experiment where dust in an exhaust gas is removed by using an exhaust gas treatment apparatus including the exhaust gas cleaning apparatus according to the first and second embodiments of the present invention;

DETAILED DESCRIPTION OF THE INVENTION

Figure 1:
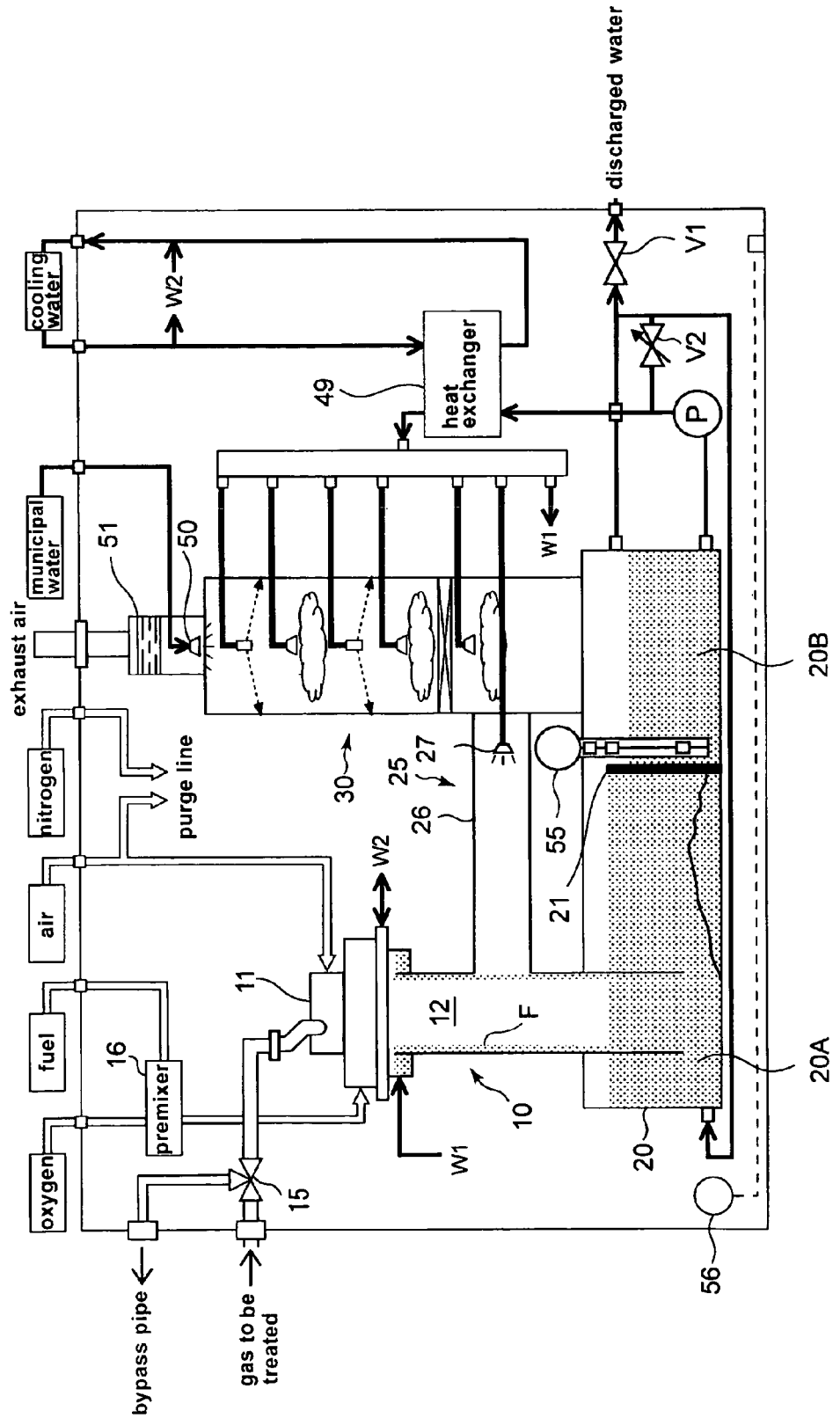
FIG. 1 is a schematic view showing an exhaust gas treatment system including an exhaust gas cleaning apparatus according to a first embodiment of the present invention.

Embodiments of the present invention will be described in detail below with reference to the accompanying drawings. The same or corresponding members or elements having the same operation or function are denoted by the same reference numerals throughout views.

FIG. 1 is a schematic view showing an exhaust gas treatment system including an exhaust gas cleaning apparatus according to a first embodiment of the present invention. As shown in FIG. 1, the exhaust gas treatment system comprises a combustion-type heating treatment unit (exhaust gas treatment apparatus) 10 for oxidatively decomposing an exhaust gas through combustion, and an exhaust gas cleaning unit (exhaust gas cleaning apparatus according to one embodiment of the present invention) 30 arranged at a stage subsequent to the heating treatment unit 10. The heating treatment unit 10 has a combustion chamber 12 for combusting the exhaust gas, and a burner 11 for generating flames swirling in the combustion chamber 12. The exhaust gas is supplied to the heating treatment unit 10 via a bypass valve (three-way valve) 15. If any problem is detected on the exhaust gas treatment system, this bypass valve 15 is operated so that the exhaust gas is supplied to a bypass pipe (not shown) without being introduced into the exhaust gas treatment system.

Fuel and oxygen are mixed in a premixer 16 in advance to form mixed fuel, and this mixed fuel is supplied to the burner 11. Further, air as an oxygen source for combusting (oxidizing) the exhaust gas is supplied to the burner 11. The burner 11 combusts the mixed fuel to form swirling flames in the combustion chamber 12, and the exhaust gas is combusted by the swirling flames. A UV sensor (not shown) is disposed inside the burner 11 and it is monitored by the UV sensor whether the swirling flames are formed normally. Air and nitrogen are supplied around the UV sensor as purge gas. Water W1 is supplied to the upper part of the combustion chamber 12. This water W1 flows down along the inner surface of the combustion chamber 12 and a water film F is formed on the inner surface of the combustion chamber 12. The combustion chamber 12 is protected from heat of the swirling flames by the water film F. Further, a cooling water passage (not shown) through which cooling water W2 for cooling the burner 11 flows is provided between the burner 11 and the combustion chamber 12.

The exhaust gas introduced into the combustion chamber 12 through the burner 11 is combusted by the swirling flames. Thus, combustible gases such as silane, disilane and the like contained in the exhaust gas are oxidatively decomposed. At this time, by combustion of the combustible gases, silica ($SiO_2$) is produced as a by-product. This silica exists in the exhaust gas as fine dust.

A part of such a by-product is accumulated on the inner surface of the burner 11 or the combustion chamber 12. Therefore, the heating treatment unit 10 is configured to operate a scraper (not shown) periodically so that the by-product accumulated on the burner 11 or the inner surface of the combustion chamber 12 is scraped off. A circulation tank 20 is disposed below the combustion chamber 12. A weir 21 is provided inside the circulation tank 20, and the circulation tank 20 is partitioned into a first tank 20A at an upstream side and a second tank 20B at a downstream side. The by-product scraped off by the scraper is accumulated on the bottom of the first tank 20A. Further, the water film F which has flowed down along the inner surface of the combustion chamber 12 flows into the first tank 20A. The water in the first tank 20A flows over the weir 21 and flows into the second tank 20B.

The combustion chamber 12 communicates with the exhaust gas cleaning unit 30 through a cooling unit 25. This cooling unit 25 has a pipe 26 extending toward the combustion chamber 12 and a spray nozzle 27 arranged in the pipe 26. The spray nozzle 27 sprays water countercurrently into the exhaust gas flowing in the pipe 26 (i.e., the flow of water from spray nozzle 27 is opposite the flow of exhaust gas). Therefore, the exhaust gas treated by the heating treatment unit 10 is cooled by water sprayed from the spray nozzle 27. Water is recovered to the circulation tank 20 through the pipe 26.

The cooled exhaust gas is then introduced into the exhaust gas cleaning unit 30. This exhaust gas cleaning unit 30 is an apparatus for cleaning the exhaust gas with water and removing fine dust contained in the exhaust gas. This dust is mainly composed of a by-product produced by oxidative decomposition (combustion treatment) in the heating treatment unit 10.

Figure 2:
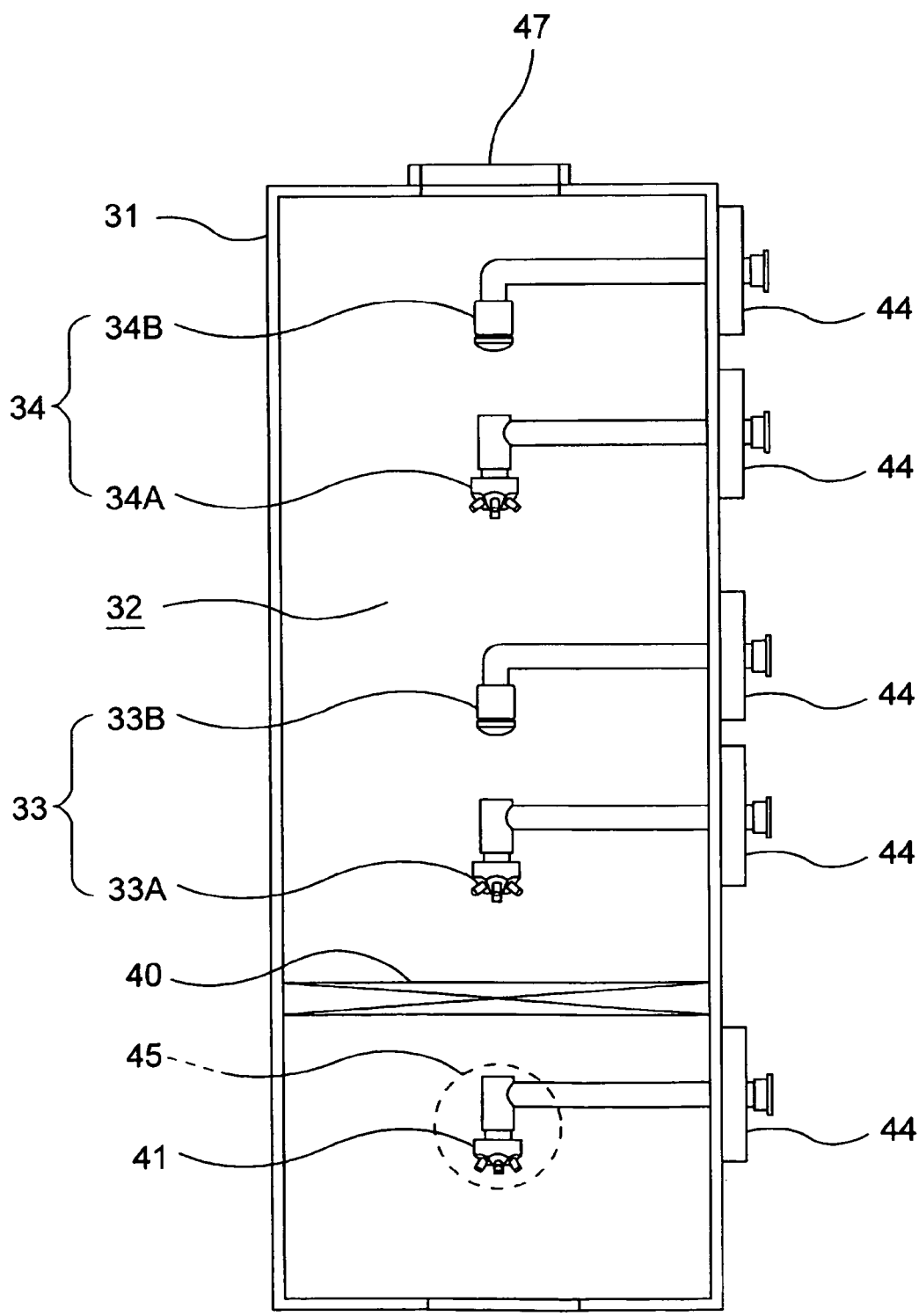
FIG. 2 is a side view showing an exhaust gas cleaning unit shown in FIG. 1.
Figure 3:
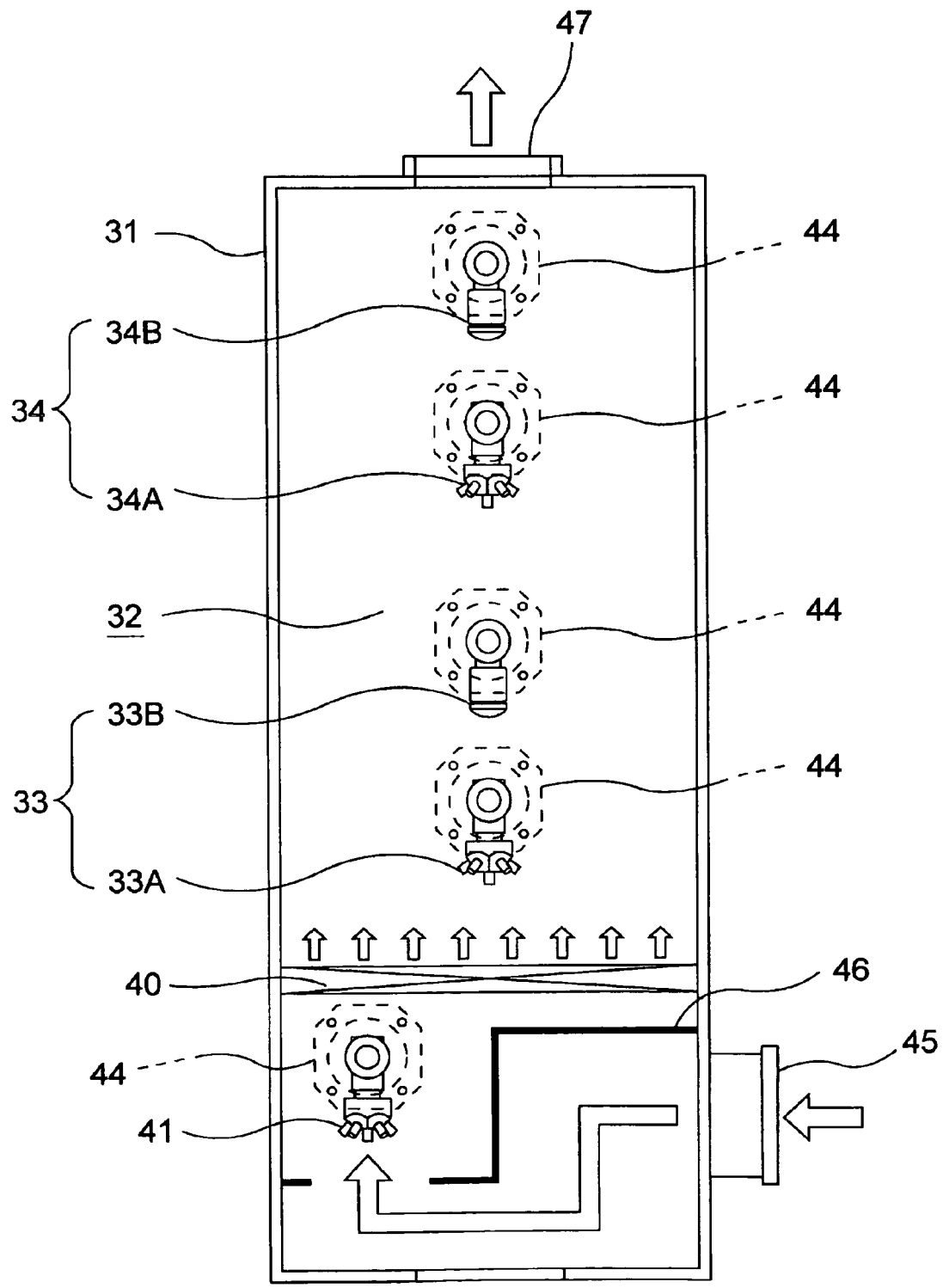
FIG. 3 is a front view showing the exhaust gas cleaning unit shown in FIG. 1.

FIG. 2 is a side view showing the exhaust gas cleaning unit 30 shown in FIG. 1. FIG. 3 is a front view showing the exhaust gas cleaning unit 30 shown in FIG. 1. As shown in FIGS. 2 and 3, the exhaust gas cleaning unit 30 comprises a wall member 31 for forming a gas passage 32, and a first mist nozzle 33A, a first water film nozzle 33B, a second mist nozzle 34A and a second water film nozzle 34B disposed in the gas passage 32. These mist nozzles 33A and 34A and water film nozzles 33B and 34B are located at the central portion of the gas passage 32, and are arranged substantially linearly. The first mist nozzle 33A and the first water film nozzle 33B constitute a first nozzle unit 33, and the second mist nozzle 34A and the second water film nozzle 34B constitute a second nozzle unit 34. Therefore, in this embodiment, two sets of nozzle units 33 and 34 are provided. One set of nozzle units or three or more sets of nozzle units may also be provided.

The first mist nozzle 33A is disposed further upstream in a flowing direction of an exhaust gas than the first water film nozzle 33B. Similarly, the second mist nozzle 34A is disposed further upstream than the second water film nozzle 34B. Specifically, the mist nozzle and the water film nozzle are alternately disposed. The mist nozzles 33A and 34A, the water film nozzles 33B and 34A, and the wall member 31 are composed of corrosion-resistant resin (e.g., PVC: polyvinyl chloride).

Structures and sizes of the first mist nozzle 33A and the second mist nozzle 34A are identical to each other, and structures and sizes of the first water film nozzle 33B and the second water film nozzle 34B are identical to each other. Therefore, only the first mist nozzle 33A and the first water film nozzle 33B will be described in detail below.

Figure 4A:
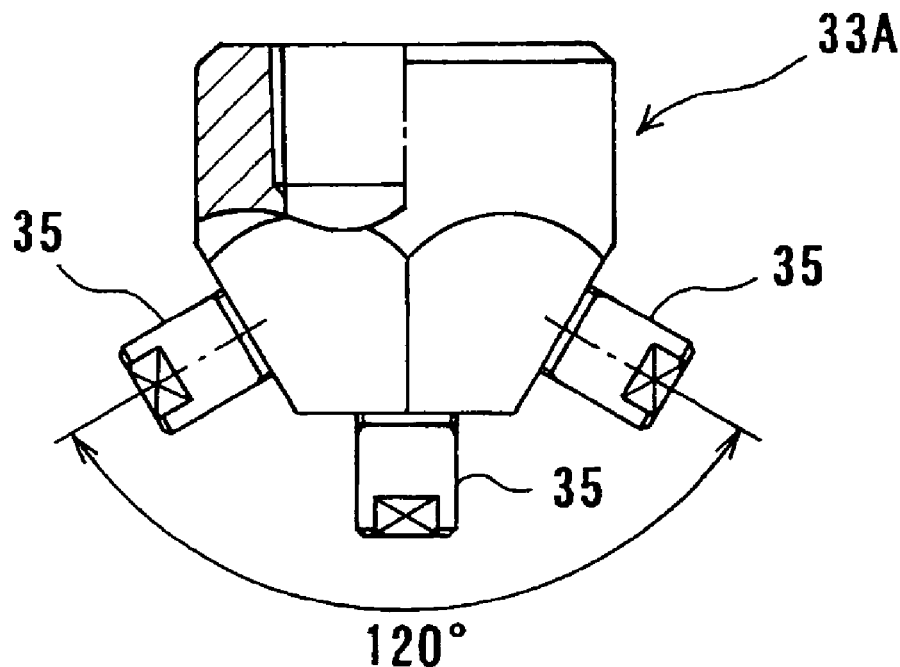
FIG. 4A is a side view showing a mist nozzle and FIG. 4B is a bottom view showing the mist nozzle.
Figure 4B:
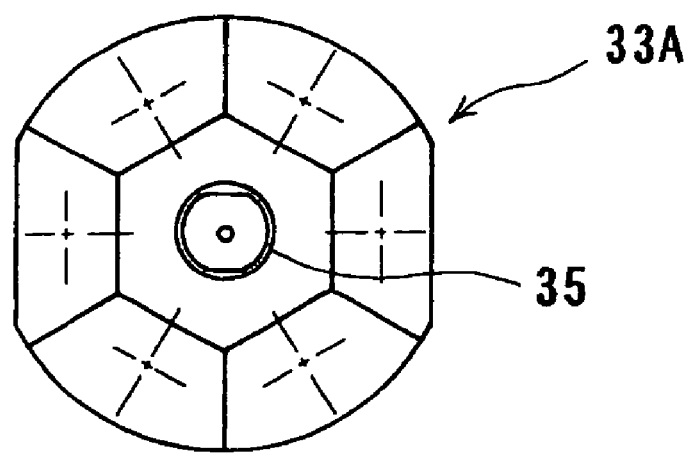

FIG. 4A is a side view showing the mist nozzle and FIG. 4B is a bottom view showing the mist nozzle. As shown in FIGS. 4A and 4B, the mist nozzle 33A includes a plurality of spray nozzles 35 (seven spray nozzles in this embodiment). In FIGS. 4A and 4B, some of the spray nozzles 35 are shown. The spray nozzles 35 are arranged radially and directed downward. The angle between any two spray nozzles 35 disposed symmetrically with respect to the spray nozzle 35 disposed at the central portion is 120 degrees. Mist is sprayed from the forward ends of the respective spray nozzles 35 (i.e., in an upstream direction relative to the flow direction of the exhaust gas). Mist is composed of microparticulated water particles and respective water particles have a diameter of about 100 μm. The mist sprayed from the mist nozzle 33A stays in the gas passage 32 and is brought into contact with the exhaust gas flowing upwardly through the gas passage 32.

Figure 5A:
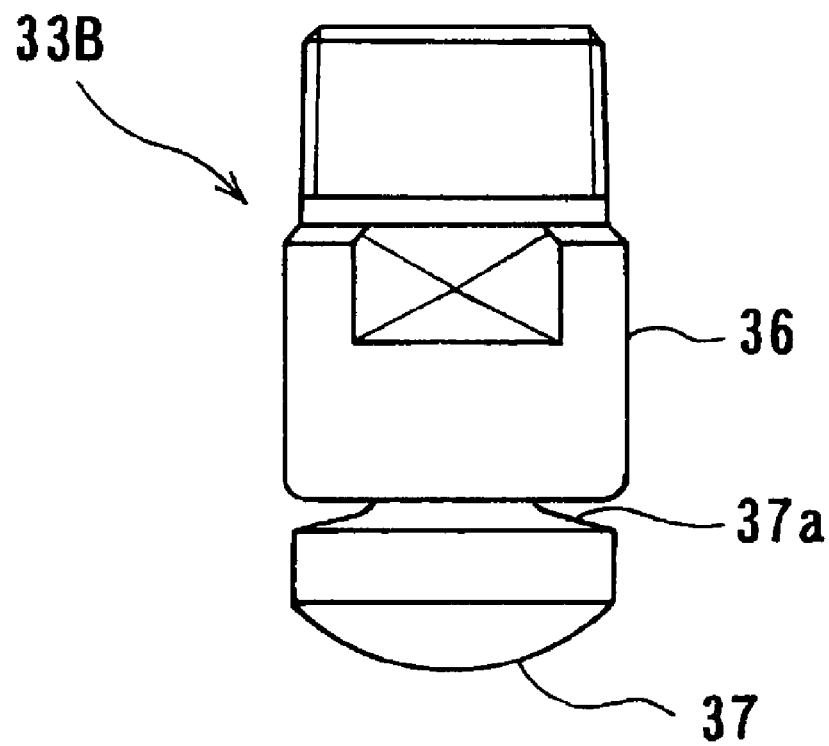
FIG. 5A is a side view showing a water film nozzle and FIG. 5B is a bottom view showing the water film nozzle.
Figure 5B:
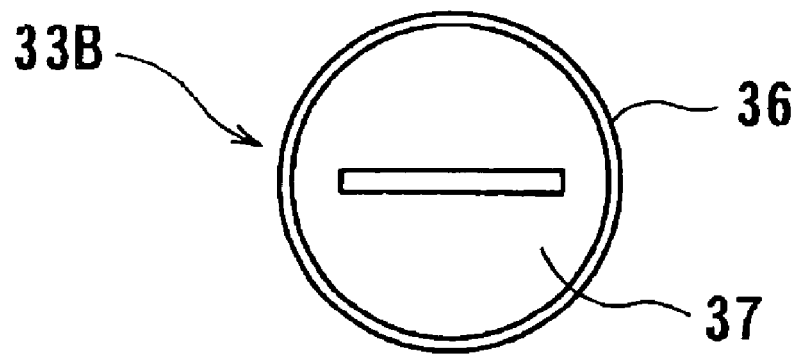

FIG. 5A is a side view showing the water film nozzle and FIG. 5B is a bottom view showing the water film nozzle. As shown in FIGS. 5A and 5B, the water film nozzle 33B includes an outer nozzle 36 and a center nozzle 37. Water is sprayed through a gap between the outer nozzle 36 and the center nozzle 37. An upper surface 37a of the center nozzle 37 is curved, and water is sprayed radially outwardly along this upper surface 37a, and hence a water film is formed in an entire circumferential direction. The water film reaches an inner surface of the wall member 31, and thus the water film is formed so as to block the gas passage 32 (see FIG. 1).

A flow control member 40 for regulating flow of an exhaust gas is disposed at an upstream side of the first mist nozzle 33A. This flow control member 40 causes pressure loss of the exhaust gas and makes the flow of the exhaust gas in the gas passage 32 uniform. It is preferable that the flow control member 40 is composed of a material other than metal in order to prevent acid corrosion. As an example of the flow control member 40, there is a nonwoven material made of resin or a resin plate having a plurality of openings.

Figure 6A:
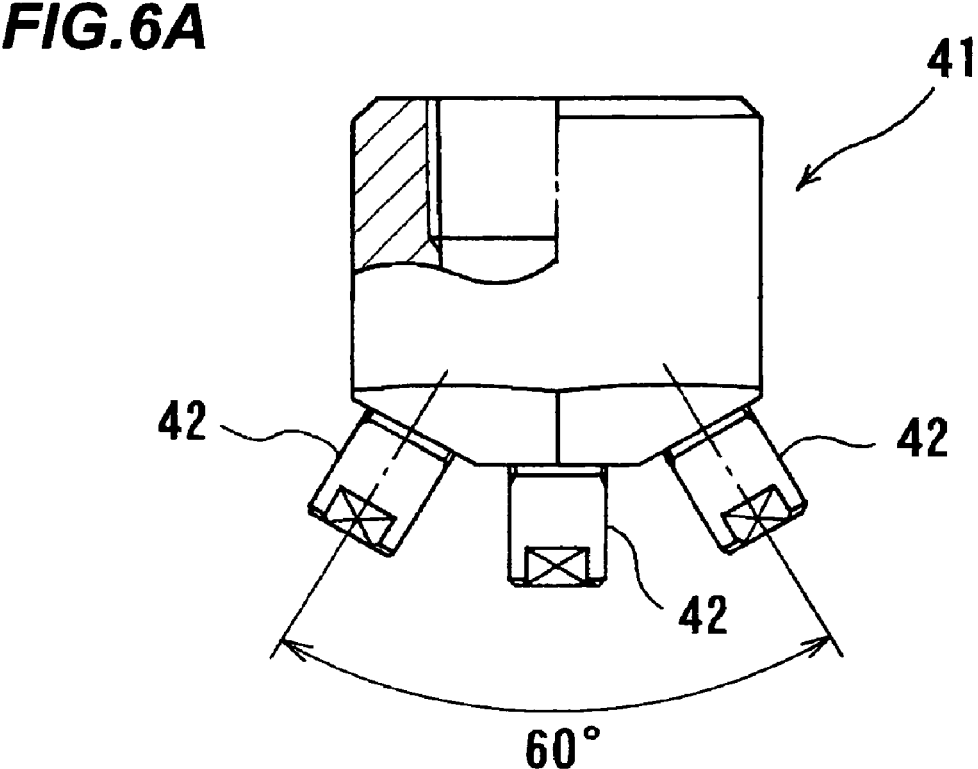
FIG. 6A is a side view showing a mist nozzle and FIG. 6B is a bottom view showing the mist nozzle.
Figure 6B:
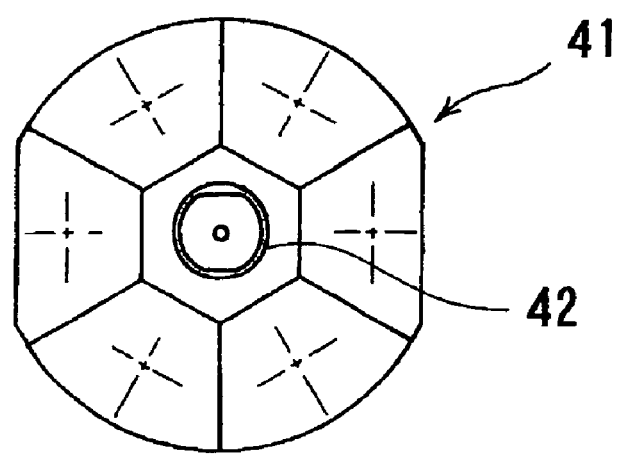

A mist nozzle 41 is disposed at an upstream side of the flow control member 40. FIG. 6A is a side view showing the mist nozzle 41 and FIG. 6B is a bottom view showing the mist nozzle 41. As shown in FIGS. 6A and 6B, the structure of this mist nozzle 41 is basically the same as that of the mist nozzle 33A shown in FIGS. 4A and 4B. However, the angle between any two spray nozzles 42 disposed symmetrically with respect to the spray nozzle 42 disposed at the central portion is 60 degrees.

The mist nozzles 33A, 34A and 41 and the water film nozzles 33B and 34B are attached to the wall member 31 through respective flanges 44. When performing maintenance on the mist nozzles 33A, 34A and 41 and the water film nozzles 33B and 34B, the flange 44 is detached from the wall member 31, and the mist nozzle or the water film nozzle is taken out from the gas passage 32. Similarly, the flow control member 40 can be taken out from the gas passage 32.

As shown in FIG. 3, the exhaust gas is introduced into the interior of the exhaust gas cleaning unit 30 from an introduction port 45 provided at a lower portion of the exhaust gas cleaning unit 30. The exhaust gas flows from the lower part to the upper part in the exhaust gas cleaning unit 30. More specifically, the exhaust gas introduced from the introduction port 45 is first directed toward the mist nozzle 41 by a guide plate 46 provided inside the exhaust gas cleaning unit 30. Then, the exhaust gas passes through the mist formed by the mist nozzle 41 and the flow of the exhaust gas is regulated by the flow control member 40. The exhaust gas which has passed through the flow control member 40 forms a uniform flow and moves upwards through the gas passage 32 at low speed. Mist, water film, mist and water film are formed in the gas passage 32 in that order (see FIG. 1).

Fine dust having a diameter of less than 1 μm contained in the exhaust gas easily adheres to water particles forming mist by diffusion action (Brownian movement), and thus the fine dust is trapped by the mist. Dust having a diameter of not less than 1 μm is mostly trapped by the water particles in the same manner. Since a diameter of the water particles is approximately 100 μm, the size (diameter) of the dust adhering to these water particles becomes large apparently. Therefore, the water particles containing dust easily hit the water film at the downstream side due to inertial impaction, and the dust is thus removed from the exhaust gas together with the water particles. Dust having a relatively large diameter which has not been trapped by the mist is also trapped by the water film in the same manner and is removed. In this manner, the exhaust gas is cleaned by water and the cleaned exhaust gas is discharged from a discharge port 47.

It has been known that the inertial impaction against the water film is unlikely to occur in the case of dust having a diameter of less than 1 μm. According to the present embodiment, since the dust having a diameter of less than 1 μm easily tends to adhere to the water particles by diffusion action (Brownian movement), fine dust is mostly trapped by the water particles. The water particles which have captured the dust have a larger diameter than 1 μm, and thus the inertial impaction against the water film easily tends to occur. Therefore, the water particles are easily captured by the water film.

It is preferable that flow velocity of the exhaust gas flowing through the gas passage 32 is low. This is because low flow velocity of the exhaust gas allows duration of contact between the dust contained in the exhaust gas and the mist to be longer and consequently dust removal efficiency is increased. From such viewpoints, it is preferable that a cross-sectional area of the gas passage 32 is large. In the gas passage 32, the water film is formed above the mist. Therefore, the water film plays a role of a protective film or an umbrella for the mist and protects the mist from water droplets falling from the upper side. As a result, collapse of the mist caused by the water droplets is prevented and the dust removal efficiency is increased.

As shown in FIG. 1, the above-mentioned circulation tank 20 is disposed below the exhaust gas cleaning unit 30. Water supplied from the mist nozzles 33A, 34A and 41 and the water film nozzles 33B and 34B is recovered into the second tank 20B of the circulation tank 20. The water stored in the second tank 20B is supplied to the mist nozzles 33A, 34A and 41 and the water film nozzles 33B and 34B by a circulation pump P. A heat exchanger 49 is disposed between the circulation pump P and the exhaust gas cleaning unit 30. In this heat exchanger 49, heat exchange is performed between cooling water and circulating water (water from the circulation tank 20) and the circulating water is cooled. The cooled circulating water is supplied to the mist nozzles and the water film nozzles. At the same time, the circulating water is supplied to an upper portion of the combustion chamber 12 of the heating treatment unit 10 as water W1, and as described above, the water film F is formed on an inner surface of the combustion chamber 12.

As described above, water to be supplied to the mist nozzles 33A and 34A and the water film nozzles 33B and 34B is water recovered by the circulation tank 20 and contains dust (such as a by-product). Therefore, in order to clean the gas passage 32, municipal water is supplied to the gas passage 32 from a shower nozzle 50 disposed above the discharge port 47 (see FIGS. 2 and 3). A mist trap 51 is provided above the shower nozzle 50. This mist trap 51 has a plurality of baffle plates therein and serves to trap the mist having passed through the discharge port 47. In this manner, the treated and detoxified exhaust gas is finally released into the atmosphere.

A liquid level sensor 55 is provided in the circulation tank 20. This liquid level sensor 55 monitors liquid level of the second tank 20B, and when the liquid level of the second tank 20B exceeds a predetermined level, a valve V1 is opened to discharge water in the second tank 20B. Further, a part of the water pumped by the circulation pump P flows into the first tank 20A from a side portion of the circulation tank 20. The flowing water washes out by-products which have accumulated on the bottom of the first tank 20A toward the weir 21. Thus, the lower end opening of the combustion chamber 12 is prevented from being blocked by the by-products. A leakage sensor 56 is disposed below the circulation tank 20 to monitor water leakage from the circulation tank 20.

Figure 7:
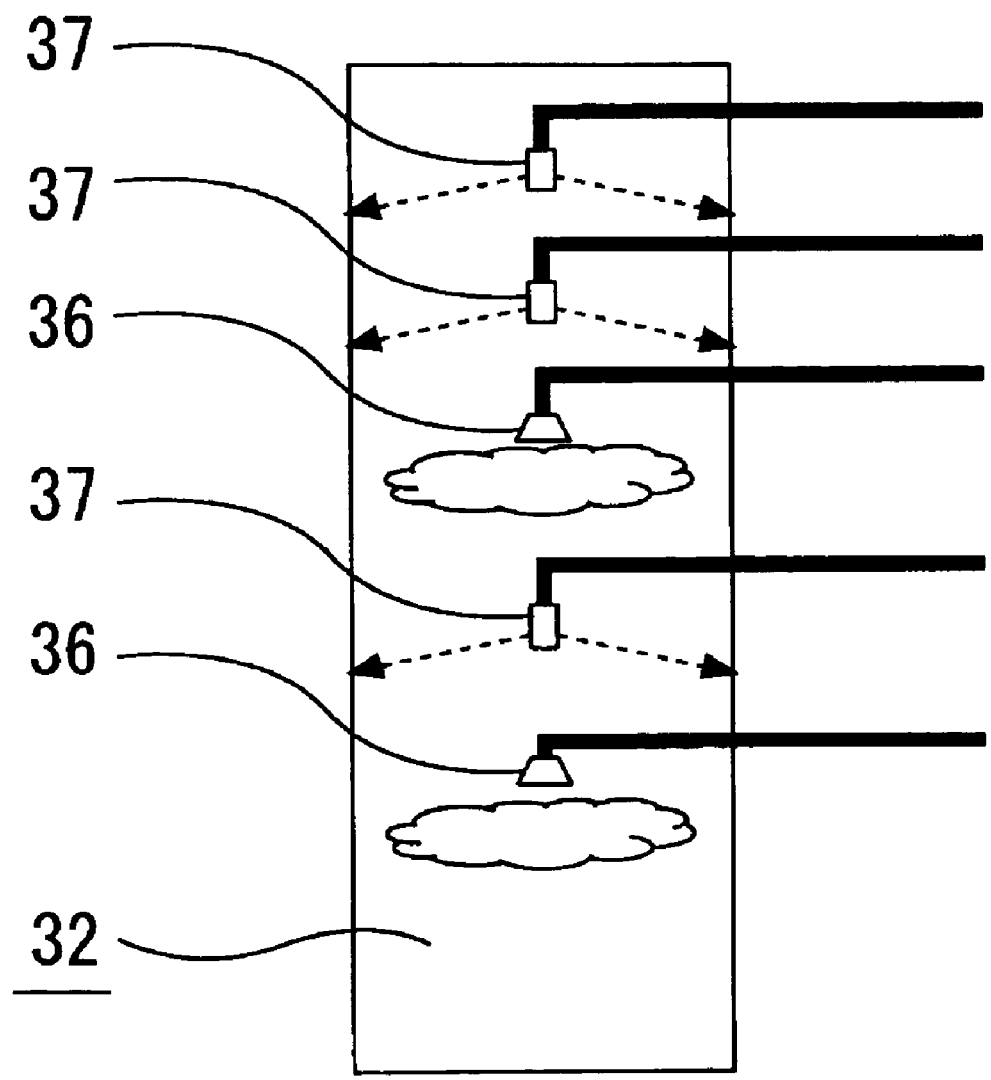
FIG. 7 is a schematic view showing an exhaust gas cleaning apparatus according to a second embodiment of the present invention.

FIG. 7 is a schematic view showing an exhaust gas cleaning apparatus according to a second embodiment of the present invention. Structures of the present embodiment, which will not be described particularly, are identical to those of the first embodiment, and repetitive explanations are omitted. In the exhaust gas cleaning apparatus according to the present embodiment, as shown in FIG. 7, a mist nozzle 36, a water film nozzle 37, a mist nozzle 36, a water film nozzle 37 and a water film nozzle 37 are arranged along the gas passage 32 in that order. A flow control member is not provided in this exhaust gas cleaning apparatus. Structures of the mist nozzle 36 and the water film nozzle 37 shown in FIG. 7 are identical to those of the mist nozzle shown in FIGS. 4A and 4B and the water film nozzle shown in FIGS. 5A and 5B, respectively.

Next, experimental results conducted by using the exhaust gas cleaning apparatus according to the above-described first and second embodiments will be described with reference to FIG. 8.

Figure 9:
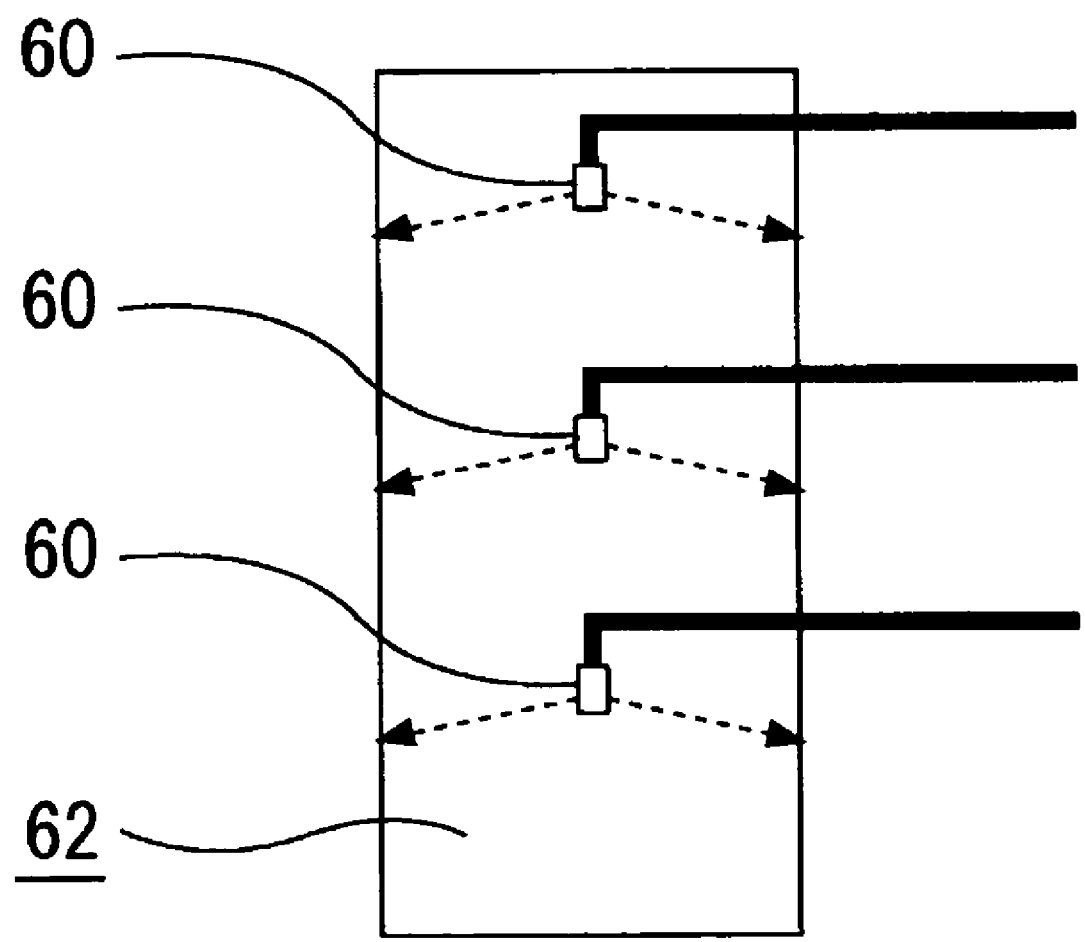
FIG. 9 is a schematic view showing the exhaust gas cleaning apparatus used for an experiment as a comparative example shown in FIG. 7.

FIG. 8 is a table showing results of an experiment where dust in an exhaust gas is removed by using the exhaust gas cleaning apparatus according to the above-described respective embodiments and the table includes results of an experiment conducted as a comparative example of the present embodiment. FIG. 9 is a schematic view showing the exhaust gas cleaning apparatus used for the experiment as the comparative example shown in FIG. 8. In this exhaust gas cleaning apparatus, as shown in FIG. 9, a mist nozzle and a flow control member are not provided and three water film nozzles 60 are arranged along a gas passage 62.

Each of the experimental results shown in FIG. 8 was obtained by using the exhaust gas cleaning apparatuses shown in FIGS. 3, 7 and 9, respectively as the exhaust gas cleaning apparatus of the exhaust gas treatment system shown in FIG. 1. As experimental conditions, silane ($SiH_4$): 0.2 slm and dilute nitrogen: 170 L/min were supplied as gas to be treated, and city gas (13 A): 13 L/min and oxygen: 21 L/min were supplied as fuel for forming treatment flames. Under these conditions, dust removal was performed and dust removal efficiency was examined. If dust concentration (g/L), discharged from the exhaust gas cleaning apparatus, divided by dust concentration when assuming that all the silane which has flowed into the exhaust gas cleaning apparatus becomes $SiO_2$ is expressed as x, the dust removal efficiency can be expressed as $(1-x)\Delta 100$.

In the comparative example, a dust removal experiment was conducted by using the exhaust gas cleaning apparatus shown in FIG. 9. As a result, as shown in FIG. 8, the dust removal efficiency was 73.0%. In the experimental example 2, a dust removal experiment was conducted by using the exhaust gas cleaning apparatus shown in FIG. 7. As a result, as shown in FIG. 8, the dust removal efficiency was 83.4%. In the experimental example 1, a dust removal experiment was conducted by using the exhaust gas cleaning apparatus shown in FIGS. 2 and 3. As a result, as shown in FIG. 8, the dust removal efficiency was 87.3%. The numerical value obtained in the experimental example 1 is substantially equal to the dust removal efficiency 87.4% in the case of using a fan scrubber. These experimental results have verified that high dust removal efficiency can be obtained in the exhaust gas cleaning apparatus by arranging a mist nozzle and a water film nozzle alternately, and that dust removal efficiency can be increased more by providing a flow control member 40 to make the flow velocity of the exhaust gas uniform and low.

In the above-described embodiment, the exhaust gas to be treated is an exhaust gas containing silane or disilane which is discharged from manufacturing apparatuses of semiconductor devices or liquid crystal panels. However, the exhaust gas to be treated in the present invention is not limited to the above. Further, the exhaust gas cleaning apparatus according to the present invention can be disposed at an upstream side of the heating treatment unit. Hereinafter, an example in which the above-described exhaust gas cleaning apparatus is disposed at an upstream side of the heating treatment unit will be described with reference to FIG. 10.

In an etching process of semiconductor devices, a fluorine-containing gas ($NF_3$, $ClF_3$, $SF_6$, $CHF_3$, $C_2F_6$, $CF_4$) is generally used. It is considered that this fluorine-containing gas, which is a hardly decomposable gas, causes global warming. Therefore, an exhaust gas discharged from an etching apparatus cannot be released into the atmosphere as it is. The exhaust gas treatment system shown in FIG. 10 is a system for treating an exhaust gas containing the fluorine-containing gas.

Figure 10:
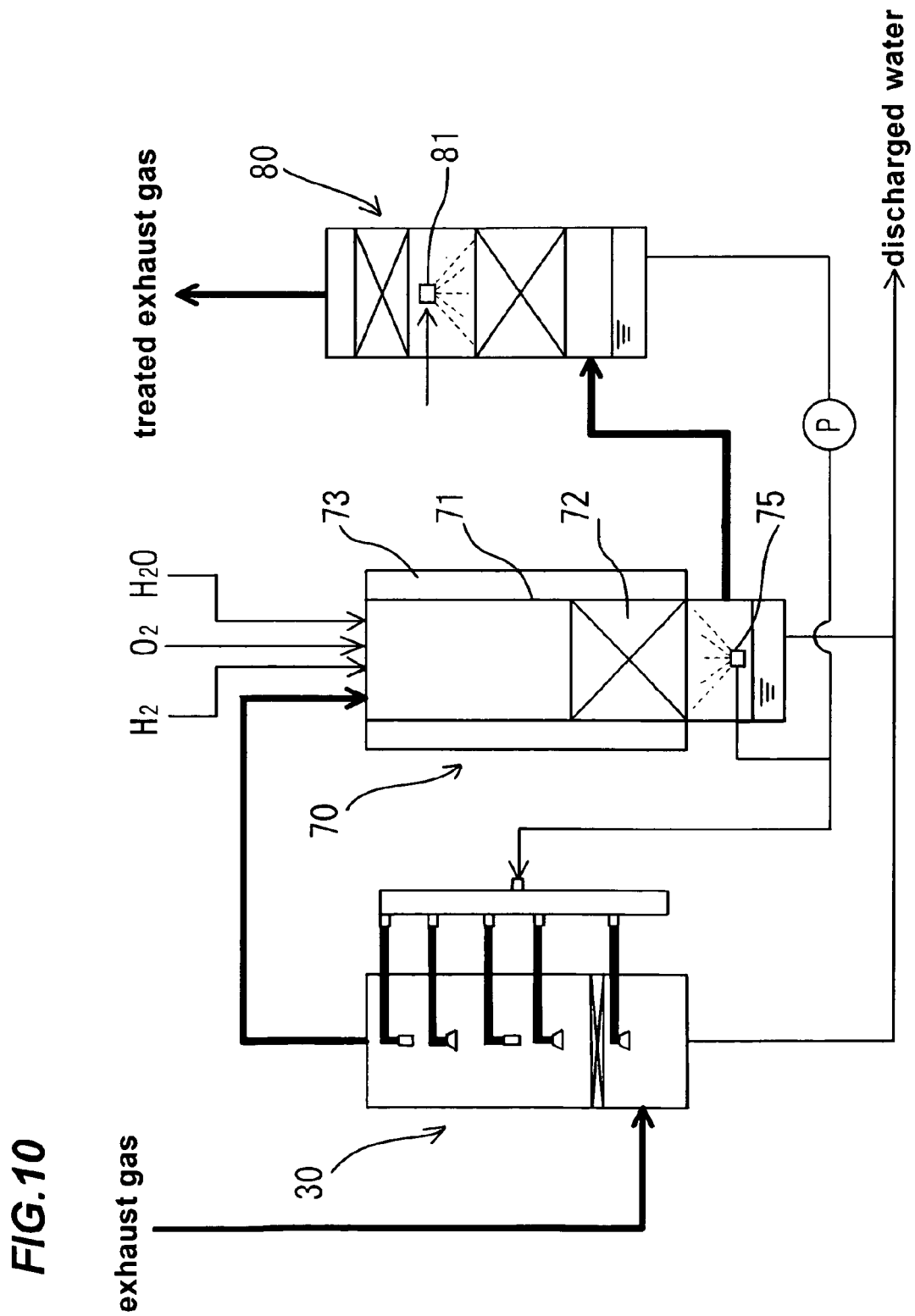
FIG. 10 is a schematic view showing another exhaust gas treatment system including the exhaust gas cleaning apparatus according to the first embodiment of the present invention.

The exhaust gas treatment system shown in FIG. 10 comprises the exhaust gas cleaning unit 30 according to the first embodiment of the present invention, a catalytic heating treatment unit (exhaust gas treatment apparatus) 70 connected to the exhaust gas cleaning unit 30, and an acid gas treatment port (water spray tower) 80 connected to the heating treatment unit 70. The exhaust gas cleaning unit 30 is disposed at an upstream side of the heating treatment unit 70, and the heating treatment unit 70 is disposed at an upstream side of the acid gas treatment port 80. Instead of the exhaust gas cleaning apparatus according to the first embodiment, the exhaust gas cleaning apparatus according to the second embodiment shown in FIG. 7 may be used.

The heating treatment unit 70 is an exhaust gas treatment system configured to treat an exhaust gas by using a catalyst. More specifically, the heating treatment unit 70 has a cylindrical column 71, a catalyst layer 72 disposed in the column 71, and a heater 73 attached to an outer circumferential surface of the column 71. The heater 73 heats the catalyst layer 72 to a temperature of 600 to 900° C. At least one of $H_2$, $O_2$, and $H_2O$ is supplied into the column 71 as decomposition assist gas. By allowing the exhaust gas to pass through the catalyst layer 72 in this state, the above-described fluorine-containing gas is decomposed into an acid gas and $CO_2$. As a catalyst used for the catalyst layer 72, γ-alumina is preferably used.

In the etching process, since an insulating film (e.g., $SiO_2$) or the like is removed by etching, an exhaust gas discharged from the etching apparatus contains fine dust such as silica ($SiO_2$) or the like in addition to the above-described fluorine-containing gas. If the exhaust gas containing such dust is introduced directly into the catalyst layer 72, the dust is trapped by the catalyst layer 72, thereby causing the catalyst layer 72 to be blocked before long. Accordingly, before treatment by the heating treatment unit 70, the exhaust gas is introduced into the exhaust gas cleaning unit 30 and fine dust is removed from the exhaust gas by the exhaust gas cleaning unit 30. Thus, the heating treatment unit 70 at the downstream side is prevented from being blocked by dust. The exhaust gas which has passed through the catalyst layer 72 is cooled by cooling water from the spray nozzle 75 and introduced into an acid gas treatment unit 80.

The acid gas treatment unit (water spray tower) 80 has a spray nozzle 81 for spraying water to the exhaust gas. An acid gas is removed from the exhaust gas by the water supplied from the spray nozzle 81. The exhaust gas thus treated is released into the atmosphere as a detoxified and treated gas. The water supplied from the spray nozzle 81 is supplied to the heating treatment unit 70 and the exhaust gas cleaning unit 30 by the pump P, and then discharged.

The exhaust gas cleaning apparatus of the present invention can be combined with a heater-type exhaust gas treatment apparatus configured to heat and treat an exhaust gas in a heating column by an electrothermal heater as well as the above-described combustion-type or catalytic exhaust gas treatment apparatus.

Although certain preferred embodiments of the present invention have been shown and described in detail, it should be understood that various changes and modifications may be made therein without departing from the scope of the appended claims.

INDUSTRIAL APPLICABILITY

An exhaust gas cleaning apparatus according to the present invention is preferably applicable to a treatment system for treating an exhaust gas discharged from a manufacturing apparatus of semiconductor devices or liquid crystal panels.

The invention claimed is:

1. An exhaust gas cleaning apparatus comprising:
a wall member configured to form a gas passage for allowing an exhaust gas to pass therethrough; and
at least one set of nozzles, each set of nozzles including a mist nozzle and a water film nozzle disposed in said gas passage;
wherein said mist nozzle comprises a plurality of spray nozzles for forming mist in said gas passage, said spray nozzles being configured to spray a liquid mist in an upstream direction from an upstream end of each of said spray nozzles relative to a flow direction of the exhaust gas;
said water film nozzle forms a water film in said gas passage; and
said mist nozzle is disposed further upstream relative to the flow direction of the exhaust gas than said water film nozzle;
wherein said water film nozzle is configured to spray liquid in a radial direction from an entire circumference of said water film nozzle so as to form the water film in an entire circumferential direction with respect to said water film nozzle so that said water film reaches an inner surface of said wall member to block passage of the exhaust gas; and
wherein said water film nozzle comprises an outer nozzle and center nozzle, said outer nozzle and said center nozzle being arranged to form a gap therebetween, said center nozzle having a curved upper surface to guide the liquid through said gap and along said curved upper surface to form the water film in the entire circumferential direction with respect to said water film nozzle.

2. The exhaust gas cleaning apparatus according to claim 1, comprising a plurality of sets of nozzles, each of said sets of nozzles including a respective mist nozzle and a respective water film nozzle; and
said sets of nozzles each including said respective mist nozzle and said respective water film nozzle are disposed along said gas passage.

3. The exhaust gas cleaning apparatus according to claim 1, further comprising a flow control member for regulating flow of the exhaust gas located at an upstream side of said at least one set of nozzles each including said mist nozzle and said water film nozzle.

4. The exhaust gas cleaning apparatus according to claim 1, wherein said mist is formed of microparticulated water particles.

5. An exhaust gas cleaning apparatus comprising:
a wall member configured to form a gas passage for allowing an exhaust gas to pass therethrough; and
at least one set of nozzles, each set of nozzles including a mist nozzle and a water film nozzle disposed in said gas passage;
wherein said mist nozzle comprises a plurality of spray nozzles for forming mist in said gas passage, said spray nozzles being configured to spray a liquid mist in an upstream direction from an upstream end of each of said spray nozzles relative to a flow direction of the exhaust gas;
said water film nozzle forms a water film in said gas passage; and
said mist nozzle is disposed further upstream relative to the flow direction of the exhaust gas than said water film nozzle;
a flow control member for regulating flow of the exhaust gas located at an upstream side of said at least one set of nozzles each including said mist nozzle and said water film nozzle; and
an additional mist nozzle located at an upstream side of said flow control member, said additional mist nozzle having a plurality of spray nozzles configured to spray liquid in a substantially upstream direction with respect to the flow direction of the exhaust gas.

6. The exhaust gas cleaning apparatus according to claim 1, wherein each of said mist nozzle and said water film nozzle of said at least one set of nozzles is located on a central axis of said gas passage, said mist nozzle being located upstream of said water spray nozzle along said central axis.

7. The exhaust gas cleaning apparatus according to claim 5, comprising a plurality of sets of nozzles, each of said sets of nozzles including a respective mist nozzle and a respective water film nozzle; and
said sets of nozzles each including said respective mist nozzle and said respective water film nozzle are disposed along said gas passage.

8. The exhaust gas cleaning apparatus according to claim 5, wherein said mist is formed of microparticulated water particles.

9. The exhaust gas cleaning apparatus according to claim 5, wherein said water film nozzle is configured to spray liquid in a radial direction from an entire circumference of said water film nozzle so as to form the water film in an entire circumferential direction with respect to said water film nozzle so that said water film reaches an inner surface of said wall member to block passage of the exhaust gas.

10. The exhaust gas cleaning apparatus according to claim 5, wherein said water film nozzle comprises an outer nozzle and a center nozzle, said outer nozzle and said center nozzle being arranged to form a gap therebetween, said center nozzle having a curved upper surface to guide the liquid through said gap and along said curved upper surface to form the water film in the entire circumferential direction with respect to said water film nozzle.

11. The exhaust gas cleaning apparatus according to claim 5, wherein each of said mist nozzle and said water film nozzle of said at least one set of nozzles is located on a central axis of said gas passage, said mist nozzle being located upstream of said water spray nozzle along said central axis.

* * * * *